United States Patent
Potanin et al.

(10) Patent No.: US 7,253,589 B1
(45) Date of Patent: Aug. 7, 2007

(54) DUAL-SOURCE CMOS BATTERY CHARGER

(75) Inventors: Vladislav Potanin, San Jose, CA (US);
Elena Potanina, San Jose, CA (US);
Khosrow Vijeh, Sunnyvale, CA (US);
Richard Dye, San Mateo, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 390 days.

(21) Appl. No.: 10/888,299

(22) Filed: Jul. 9, 2004

(51) Int. Cl.
*H02J 7/00* (2006.01)
*H02J 7/04* (2006.01)
*H02J 1/00* (2006.01)

(52) U.S. Cl. .................. 320/138; 307/80; 320/144

(58) Field of Classification Search .............. 320/138, 320/153, 144, 152, 163, 164; 307/80, 45, 307/52; 323/269, 270; 327/534
See application file for complete search history.

(56) References Cited

U.S. PATENT DOCUMENTS

| | | | |
|---|---|---|---|
| 4,177,389 A * | 12/1979 | Schott | 307/64 |
| 4,520,275 A * | 5/1985 | Marusik | 307/64 |
| 4,857,985 A | 8/1989 | Miller | |
| 5,382,893 A * | 1/1995 | Dehnel | 320/160 |
| 5,438,270 A | 8/1995 | Harper et al. | |
| 5,530,337 A * | 6/1996 | Yamamoto | 320/138 |
| 5,548,206 A | 8/1996 | Soo | |
| 5,583,384 A | 12/1996 | Henry | |
| 5,635,821 A | 6/1997 | Smith | |
| 5,703,463 A | 12/1997 | Smith | |
| 5,710,506 A * | 1/1998 | Broell et al. | 320/145 |
| 5,717,578 A * | 2/1998 | Afzal | 320/111 |
| 5,838,171 A | 11/1998 | Davis | |
| 5,847,912 A | 12/1998 | Smith et al. | |
| 5,883,495 A | 3/1999 | Smith et al. | |
| 6,100,667 A | 8/2000 | Mercer et al. | |
| 6,157,171 A | 12/2000 | Smith | |
| 6,166,521 A | 12/2000 | Mercer et al. | |
| 6,225,787 B1 | 5/2001 | Chen et al. | |
| 6,433,516 B1 | 8/2002 | Chen | |
| 6,472,849 B1 | 10/2002 | Smith | |
| 6,496,345 B1 | 12/2002 | Smith | |
| 6,501,196 B1 * | 12/2002 | Lo | 307/125 |
| 6,541,945 B1 | 4/2003 | Smith | |
| 6,545,447 B1 | 4/2003 | Smith | |
| 6,570,746 B1 | 5/2003 | Smith | |

(Continued)

*Primary Examiner*—Karl Easthom
*Assistant Examiner*—Harry R Behm
(74) *Attorney, Agent, or Firm*—Darby & Darby PC; Davin Chin

(57) ABSTRACT

A circuit for charging a battery by selecting among two available power sources while providing overcharging and temperature protection to the battery and managing a charging current is described. A power pass and sense circuit is arranged to provide charge voltage from either power source based on control voltages from a current/voltage control circuit, which receives control signals from a logic control and timer circuit, a sensed voltage from a current setting circuit and reference and temperature voltages from a voltage reference and thermo-sense circuit. Differential amplifiers controlling power pass transistors are turned on and off depending on a power source availability and selection. A power supply circuit provides global supply voltages to all subcircuits preventing reverse current to power sources and stable supply independent of a power source availability. A pair of transistors arranged to operate as body-switcher protect power pass and sense transistors against reverse bias current.

14 Claims, 4 Drawing Sheets

U.S. PATENT DOCUMENTS

| | | |
|---|---|---|
| 6,573,682 B1 * | 6/2003 | Pearson ...................... 320/101 |
| 6,586,917 B1 | 7/2003 | Smith |
| 6,653,820 B1 | 11/2003 | Smith |
| 6,686,723 B1 | 2/2004 | Smith et al. |
| 6,697,241 B1 | 2/2004 | Smith |
| 6,702,457 B1 | 3/2004 | Smith |
| 6,744,151 B2 * | 6/2004 | Jackson et al. ............... 307/43 |

* cited by examiner

DUAL-SOURCE CMOS BATTERY CHARGER

FIELD OF THE INVENTION

The present invention relates to a battery charging system, and, in particular, to a circuit for charging a battery by selecting among two available power sources while providing overcharging and temperature protection to the battery and managing a charging current.

BACKGROUND

Generally, batteries are used to supply power to portable devices such as personal computers, radios, radiophones, stereo cassette tape players etc. Such batteries are typically available in two different types such as those characterized as rechargeable or non-rechargeable and exhibit different end of life voltage characteristics and effective series resistances. Non-rechargeable battery types are those ordinary alkaline batteries that should not be subjected to recharging attempts. Rechargeable battery types are those nickel-cadmium (Ni—Cd), nickel-hydrogen (Ni—H), lithium-ion and recently developed nickel metal-hydride (Ni—MH) batteries that should be charged at different rates with different conditions.

When a rechargeable battery is used as a power supply system for a portable personal computer, cellular phone, and the like, the battery may be charged by a battery charger in different charging modes, for example, a run and charging mode and a run or charging mode. During the run and charging mode, the battery is charged regardless of whether an end device is operating or not, and as a result, the charging operation may be difficult to control. In contrast to the run and charging mode, the run or charging mode allows the battery to be charged selectively depending upon whether the end device is operating or not.

Generally, charging operations of such a battery may be classified in at least one of a fast or rapid charging, a quick charging, a standard charging, and a trickle charging modes. The charging modes may be in relation with charging capacities or charging current of the battery. In the fast charge mode, a relatively larger charging current may be applied to the battery over a relatively short period of time, for example one to two hours. In the quick charge mode, a relatively large charging current may be applied to the battery over a relatively shorter period of time, for example four to six hours. In the standard charge mode, a relatively smaller charging current may be applied to the battery over a relatively longer period of time, for example eight to ten hours. In the trickle charge mode, the battery charging circuit provides a relatively even smaller constant current to the battery without interruption. In this mode, the battery may not be charged but its power loss due to natural discharge may be compensated.

During all charging operations, a charge level of the battery may be monitored so that, when the battery reaches its maximum charge level, the charging operation is terminated in order to prevent overcharging and damage of the battery.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Briefly stated, the present invention is related to a circuit for charging a battery that is arranged to select one of two available power sources and provide a charge voltage based on a selected power source voltage and control voltages, while further providing overcharging and temperature protection to the battery and managing a charging current.

A power pass and sense circuit is arranged to provide the charge voltage from either power source based on the control voltages from a current/voltage control circuit, which receives control signals from a logic control and timer circuit, a sensed voltage from a current setting circuit, and reference and temperature voltages from a voltage reference and thermo-sense circuit. Differential amplifiers of the current/voltage control circuit, controlling power pass transistors, are turned on and off depending on a power source availability and selection. A logic control and timer circuit is arranged to receive various reference voltages and compare them to battery charge voltage, temperature sense voltage, charge current levels, and the like, determining different conditions such as battery charge restart, battery full, end of charge cycle, and the like. Based on these conditions, the logic control and timer circuit may provide control signals to current/voltage control circuit managing the power source to be used, a charge current level, a charge cycle, and the like. A power supply circuit is arranged to provide global supply voltages to all subcircuits preventing reverse current to power sources and providing stable supply independent of a power source availability.

While a preferred embodiment of the present invention may be implemented in a dual source battery charging circuit, the invention is not so limited. The described circuit and parts of it may be employed as part of virtually any power supply circuit known to those skilled in the art.

Figure 1:
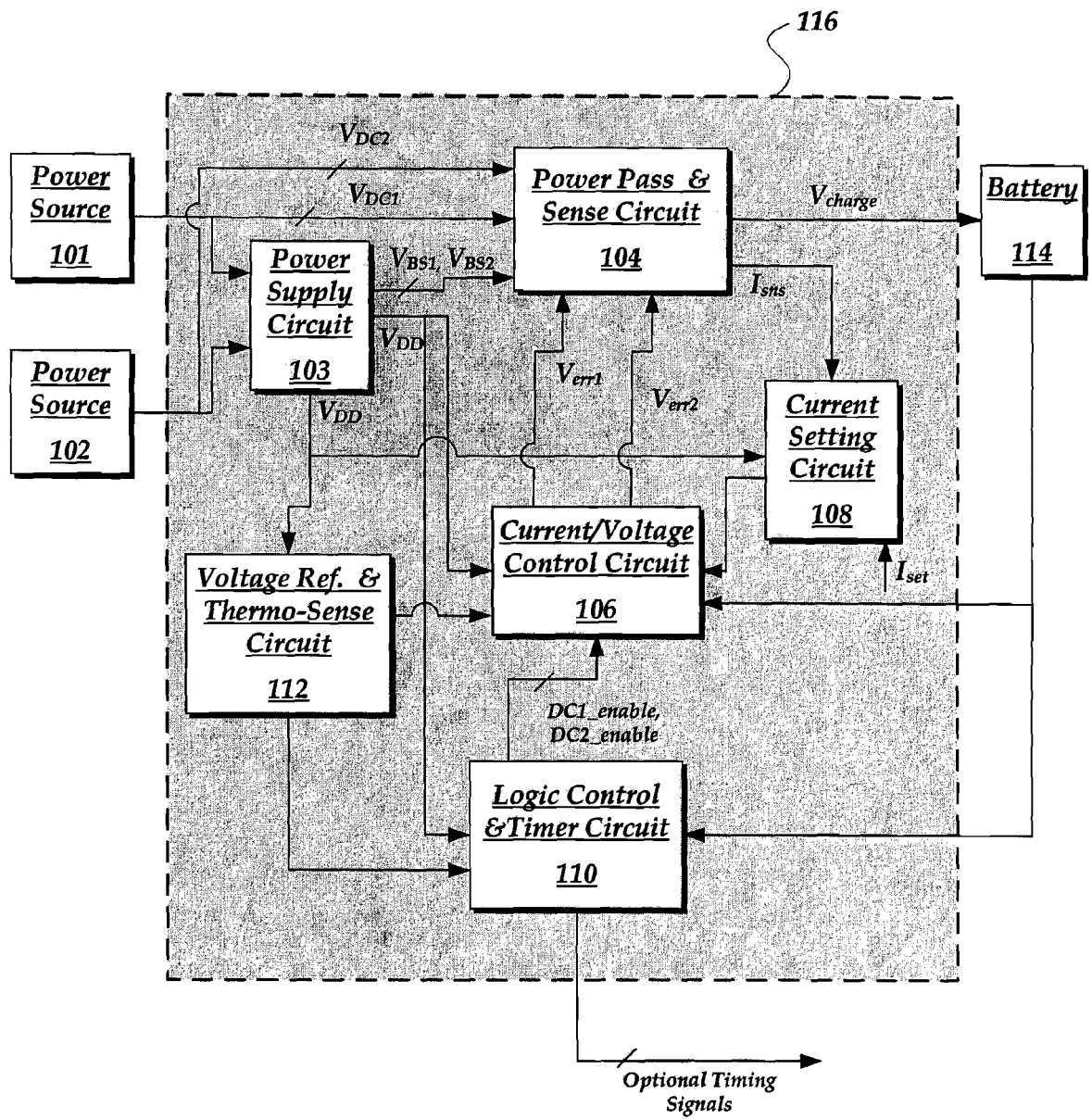
FIG. 1 illustrates a block diagram of an embodiment of a battery charging circuit according to the present invention.

FIG. 1 illustrates a block diagram of an embodiment of a battery charging circuit 116 according to the present invention along with two power sources and a battery. The block diagram includes power source 101, power source 102, battery charging circuit 116 and battery 114. Power sources 101 and 102 may include any DC power source such as an AC/DC converter, a DC/DC converter, another battery, and they like.

Battery charging circuit 116 includes power supply circuit 103, power pass and sense circuit 104, current setting circuit 108, current/voltage control circuit 106, logic control & timer circuit 110, and voltage reference & thermo-sense circuit 112.

Power supply circuit 103 is arranged to receive power source voltages $V_{DC1}$ and $V_{DC2}$ from power sources 101 and 102 and provide global supply voltages to various subcircuits of battery charging circuit 116. By providing global supply voltages from one of the power sources, power supply circuit 103 is arranged to provide stable supply voltage to different circuitry. Power supply circuit 103 is further arranged to prevent a reverse current from battery 114 to reach either of the power sources, as well as a reverse current from one power source, for example powers source 101, to flow into the other power source, for example power source 102. Power supply 103 may be configured to provide supply voltages for different subcircuits separately, depending, in part, on the subcircuit's needs. In one embodiment, power supply circuit 103 may be arranged to provide global supply voltage to the subcircuits based on another power source, if neither power source 101 or 102 is connected to the circuit.

Power pass and sense circuit 104 is configured to receive power source voltages $V_{DC1}$ and $V_{DC2}$ from power sources 101 and 102 and provide charge voltage $V_{charge}$ to battery 114 in response to $V_{DC1}$, $V_{DC2}$, and error voltages $V_{err1}$ and $V_{err2}$ from current/voltage control circuit 106. Error voltages $V_{err1}$ and $V_{err2}$ indicate a selection of one of the available power sources by logic control and timer circuit 110 as well as control a regulation of the selected power source voltage. Power pass and sense circuit 104 is further arranged to sense a charging current and provide sensed current $I_{sns1}$ or $I_{sns2}$ (that is low relative to load current $I_{load}$) to current setting circuit 108. Power pass and sense circuit 104 is also configured to receive digital signals $V_{BS1}$ and $V_{BS2}$ from power supply 103.

Current setting circuit 108 is arranged to track a load current and provide an output signal, that is proportional to the load current, to current/voltage control circuit 106. A ratio of the sense current to the load current may be determined through a setting current $I_{set}$ provided to current setting circuit 108. In one embodiment, $I_{set}$ may be provided from a source external to battery charging circuit 116. In another embodiment, a value of internally provided $I_{set}$ may be determined by adjusting a variable resistor coupled to current setting circuit 108.

Current/voltage control circuit 106 is arranged to receive setting current $I_{set}$ from current setting circuit 108, temperature and reference voltages from voltage reference and thermo-sense circuit 112, and control signals DC1_enable and DC2_enable from logic control & timer circuit 110. In response to these voltages currents, and signals, current/voltage control circuit 106 is configured to provide error voltages $V_{err1}$ and $V_{err2}$ to power pass and sense circuit 104 effectively controlling a regulation of the charge voltage $V_{charge}$.

Logic control and timer circuit 110 is configured to receive and process various reference and limit signals such as temperature, reference, and charge voltages, setting current $I_{set}$, battery restart and full voltages (not shown), and the like. Logic control and timer circuit 110 is further arranged to select a power source to be employed in providing the charge voltage, and to provide control signals DC1_enable and DC2_enable to current/voltage control circuit indicating the selection. Logic control and timer circuit 110 is further arranged to provide timing signals to other subcircuits.

Voltage reference and thermo-sense circuit 112 is arranged to provide reference and temperature voltages based on a sensed temperature of battery 114 to current/voltage control circuit 106. Voltage reference and thermo-sense circuit 112 may further provide various reference voltages to logic control and timer circuit 110 for determination of different states such as charging restart, battery full, end of charge, and the like.

FIG. 1 shows a particular arrangement of inputs and outputs of the various components. In one embodiment, all of the components of battery charging circuit 116 may be included in the same chip. Alternatively, one or more of the components of circuit 116 may be off-chip.

Figure 2:
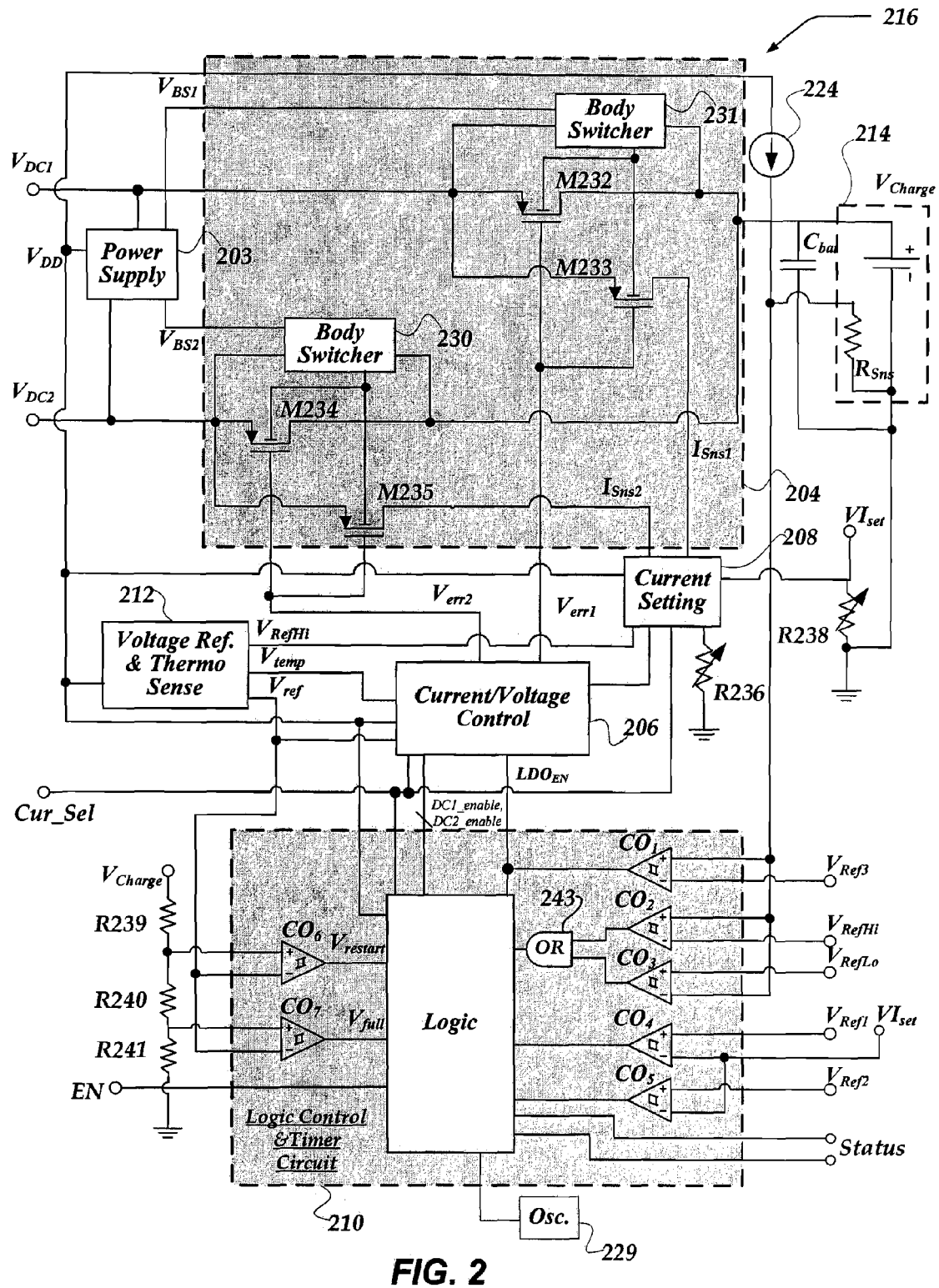
FIG. 2 schematically illustrates an embodiment of the battery charging circuit of FIG. 1.

FIG. 2 schematically illustrates an embodiment of battery charging circuit 216 with battery 214. In addition to various subcircuits illustrated in FIG. 1, battery charging circuit 216 includes other components as listed below.

Battery charging circuit 216 is arranged to receive power source voltages $V_{DC1}$ and $V_{DC2}$, and provide charge voltage $V_{Charge}$ to battery 214 based on an availability and a selection of a power source. Power supply circuit 203 is arranged to receive $V_{DC1}$ and $V_{DC2}$ and provide global supply voltages ($V_{DD}$) to various subcircuits of battery charging circuit 216 (not all shown). By providing global supply voltages independent from the power sources, power supply circuit 203 is arranged to provide stable supply voltage to different circuitry. Power supply circuit 203 is further arranged to prevent a reverse current from battery 214 to reach either of the power sources, as well as a reverse current from one power source to flow into the other power source. Power supply 203 may be configured to supply differently conditioned voltages for various subcircuits. For example, body switchers 231 and 230 are arranged to receive digital signals $V_{BS1}$ and $V_{BS2}$, respectively.

In one embodiment, battery 214 includes temperature sensing resistor $R_{Sns}$, which provides temperature sense voltage to comparators $CO_1$ through $CO_3$. Comparators $CO_2$ and $CO_3$ are arranged to compare the temperature sense voltage to predetermined reference voltage levels $V_{RefHi}$ and $V_{RefLo}$ that are provided by voltage reference and thermo-sense circuit 212. Output signals of the comparators are processed in logic OR operator 243, which provides an input to logic control and timer circuit 210 indicating whether the temperature sense voltage is above or below predetermined limits for battery temperature. In another embodiment, comparator $CO_1$ may compare the temperature sense voltage to another predetermined reference voltage $V_{Ref3}$ and provide an output directly to current/voltage control circuit 206. This predetermined level may be a safety level higher than $V_{RefHi}$ and the case when temperature sense voltage exceeds this limit is considered as battery pack is removed. Accordingly, in one embodiment current voltage control block turns off the charge voltage $V_{charge}$, and in another embodiment it may switch from current regulation to voltage regulation mode. In a further embodiment, capacitor $C_{bat}$ may be coupled across the battery terminals off-chip to provide a current stabilization for changing battery resistance.

In addition to the reference voltages listed above, voltage reference and thermo-sense circuit 212 may provide other reference voltages to be employed by logic control and timer circuit to determine particular conditions such as battery charge restart, battery full, and the like. Voltage reference and thermo-sense circuit 212 may further provide reference voltage $V_{ref}$ and temperature voltage $V_{temp}$ (indicating a temperature of the circuit) to current/voltage control circuit 206 as described below in conjunction with FIG. 4.

Logic control and timer circuit 210 may receive two additional comparator output signals from comparators $CO_4$ and $CO_5$ indicating a comparison of setting voltage $VI_{set}$ with reference voltages $V_{Ref1}$ and $V_{Ref2}$. As described previously, setting voltage $VI_{set}$ may be provided by an external source or internally by current setting circuit 208. If $VI_{set}$ is provided externally, variable resistor R238 may be employed to adjust the voltage's value. If $VI_{set}$ is provided internally, variable resistor R236 may be employed to adjust the setting voltage's value. $VI_{set}$ may be employed to determine a limit of charging current in current setting circuit 208. Logic control and timer circuit 210 is also arranged to detect if at least one power source is connected to battery charging circuit 216, employ the connected power source as the source for charge voltage, or select one of the connected power sources if both are connected. The selection of one of the power sources may be based on a predetermined algorithm, determining a default power source, and the like. If only one power source is available, that power source may be used regardless of a terminal the power source is connected to.

Logic control and timer circuit 210 may further receive condition indicator voltages $V_{restart}$ and $V_{full}$. $V_{restart}$ may be obtained through a comparison of a portion of charge voltage $V_{Charge}$ with $V_{ref}$ from voltage reference and thermo-sense circuit 212 at comparator $CO_6$. $V_{full}$ may be obtained through a comparison of another portion of charge voltage $V_{Charge}$ with $V_{ref}$ through comparator $CO_7$. The portions of $V_{Charge}$ may be determined by selecting values of resistors R239, R240, and R241, which form a voltage divider. Logic control and timer circuit 210 may be arranged to receive a clock signal from oscillator 229.

Current setting circuit 208 is arranged to receive a sense current from power sense transistors of power pass and sense circuit 204, a setting voltage $VI_{set}$, and provide a control signal to current/voltage control circuit 206 in response.

Current/voltage control circuit 206 is configured to receive reference voltage $V_{ref}$ and temperature voltage $V_{temp}$ from voltage reference and thermo-sense circuit 212, the control signal from current setting circuit 208 and provide error signals $V_{err1}$ and $V_{err2}$ to gates of power pass transistors effectively controlling a regulation of charge voltage $V_{Charge}$. Current/voltage control circuit 206 is further arranged to receive control signals DC1_enable and DC2_enable from logic control and timer circuit 210 that determine which power source is to be employed in providing $V_{Charge}$ as described below in conjunction with FIG. 4.

Power pass and sense circuit 204 is arranged to regulate a power source voltage in response to error voltages $V_{err1}$ and $V_{err2}$ from current/voltage control circuit 206, and to provide $V_{Charge}$. Power pass and sense circuit 204 includes two substantially similar subcircuits. The first subcircuit includes power pass transistor M232, power sense transistor M233 and body switcher 231, which is coupled in parallel to M232. Power pass transistor M232 provides regulated charge current in response to $V_{DC1}$, while power sense transistor M233 provides a sense current based on a portion of the regulated charge current. M232 and M233 are arranged to operate as a current mirror with a predetermined load current to sense current ratio. Body switcher 231 is arranged to protect power pass transistor M232 against a reverse bias current from the battery in case of no power source being available or one of the power source terminals being shorted to a ground. Similarly, the second subcircuit includes, similarly coupled, power pass transistor M234, power sense transistor M235, and body switcher 230. An operation of power pass and sense circuit 204 is described in more detail below in conjunction with FIG. 3.

In one embodiment, power pass and sense circuit 204 may only include two substantially similar power pass transistors. In another embodiment, power pass and sense circuit 204 may include two substantially similar power pass transistors and two corresponding body switchers coupled in parallel to the power pass transistors.

Figure 3:
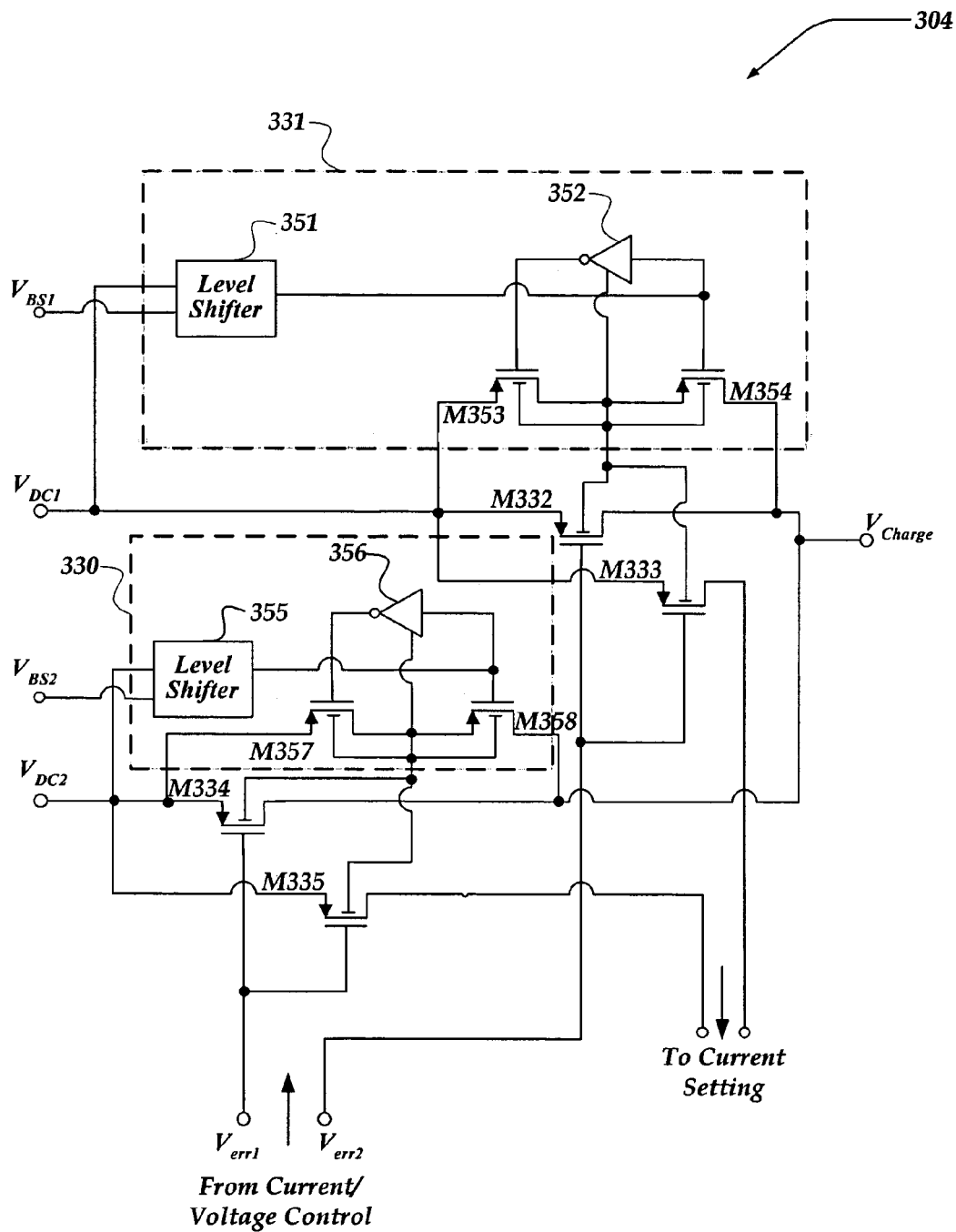
FIG. 3 schematically illustrates an embodiment of a power pass block of the battery charging circuit of FIG. 1.

FIG. 3 schematically illustrates an embodiment of power pass and sense circuit 304 of battery charging circuit 216 of FIG. 2. As described previously, power pass and sense circuit 304 is arranged to provide charge voltage $V_{charge}$ to a battery based on a selection among power source voltages $V_{DC1}$ and $V_{DC2}$. Power pass and sense circuit 304 includes two virtually identical power pass and sense subcircuits.

The first subcircuit includes level shifter 351, inverter 352, transistors M353 and M354, power pass transistor M332, and power sense transistor M333. Transistors M353 and M354, which are coupled serially, are in parallel two power pass transistor M332. Level shifter 351 is arranged to receive digital signal $V_{BS1}$, and provide a control voltage to a gate of transistor M354. The same control voltage is provided through inverter 352 to a gate of M353. Together level shifter 351, inverter 352, and transistors M353 and M354 form an embodiment of body switcher 331.

As mentioned previously, the body switchers protect power pass transistors against a reverse bias current from the battery in case of no power source being available or one of the power source terminals being shorted to a ground.

Second subcircuit includes level shifter 355, inverter 356, transistors M357 and M358, power pass transistor M334, and power sense transistor M335. Level shifter 355 is arranged to receive digital signal $V_{BS2}$. The second subcircuit is arranged to operate substantially the same way as the first subcircuit.

Power pass transistors M332 and M334 are arranged to be controlled by error voltages $V_{err1}$ and $V_{err2}$, respectively, from the current/voltage control circuit as mentioned before. These voltages are outputs of differential amplifiers in the current/voltage control circuit that are arranged to receive enable voltages from logic control and timer circuit based on the available power source(s). Thus, if one power source is not available, the corresponding differential amplifier may not provide the control voltage turning off the corresponding power pass transistor. Accordingly, $V_{Charge}$ is provided by this power source selection mechanism. If both power sources are available, the logic control and timer circuit may make a selection based on a predetermined algorithm and turn off an undesired power pass transistor.

Drains of power pass transistors M332 and M334 are coupled to a battery charging terminal providing charge voltage $V_{charge}$ depending on which power source voltage is selected and the corresponding-subcircuit is active.

Drains of power sense transistors M333 and M335 provide sense voltages to current setting circuit 226 of FIG. 2, which employs the sense voltages to provide feedback to current/voltage control circuit 206 of FIG. 2.

Figure 4:
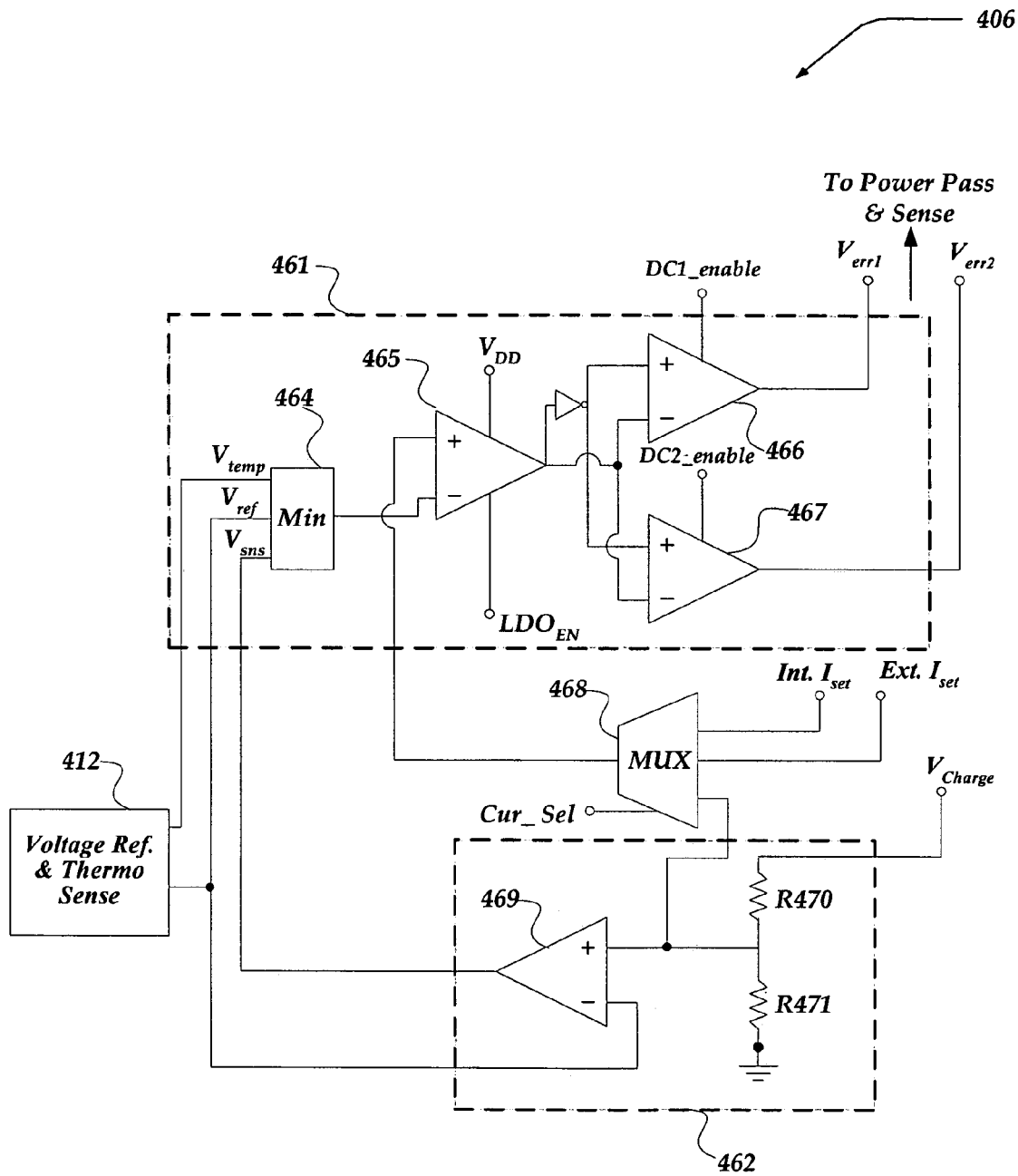
FIG. 4 schematically illustrates an embodiment of a current control block of the battery charging circuit of FIG. 1.

FIG. 4 schematically illustrates an embodiment of a current/voltage control circuit 406 of the battery charging circuit 216 of FIG. 2 along with voltage reference and thermo-sense circuit 412.

Current/voltage control circuit 406 is arranged to control power pass transistors of power pass and sense circuit, and includes current control loop and low-drop-out (LDO) amplifier 461, multiplexer 468, and voltage control loop 462.

Voltage control loop 462 is configured to receive charge voltage $V_{charge}$ from a battery charging terminal and reference voltage $V_{ref}$ from voltage reference and thermo-sense circuit 412. In response to these two voltages, voltage control loop 462 is arranged a sense voltage $V_{sns}$ to current control loop and LDO amplifier 461.

Voltage control loop 462 is also arranged to provide a portion of charge voltage $V_{charge}$ to an input of multiplexer 468, and includes a voltage divider comprising resistors R470 and R471, and differential amplifier 469. The voltage divider is arranged to provide a portion of $V_{charge}$ to a positive input of differential amplifier 469 and an input of multiplexer 468. $V_{ref}$ from voltage reference and thermo-sense circuit 412 is provided to a negative input of differential amplifier 469. Differential amplifier 469 is arranged to provide $V_{sns}$ to current control loop and LDO amplifier 461.

Multiplexer 468 is arranged to receive, in addition to the portion of $V_{charge}$, a sense current from current setting circuit based on internal setting voltage $VI_{set}$, and external setting current $I_{set}$, depending on which current is selected as described in conjunction with FIG. 2. Multiplexer 468 is further arranged to provide a multiplexed output signal to a positive input of operational amplifier 465 of current control loop and LDO amplifier 461. Multiplexer 468 selects one of the input signals in response to digital control signal Cur_sel depending on operation mode. In charge mode with external current setting the Ext. $VI_{set}$ signal is selected, while in voltage regulation mode the portion of $V_{Charge}$ from R470 and R471 is selected.

Voltage reference and thermo-sense circuit 412 is arranged to provide reference voltage $V_{ref}$ and temperature voltage $V_{temp}$ to inputs of minority selection circuit 464 of current control loop and LDO amplifier 461.

Current control loop and LDO amplifier 461 is arranged to provide error voltages $V_{err1}$ and $V_{err2}$ to gates of power pass transistors controlling a regulation by the power pass and sense circuit. Current control loop and LDO amplifier 461 includes minority selection circuit 464, operational amplifier 465 and differential amplifiers 466 and 467.

Minority selection circuit 464 determines a lowest value of the three voltages provided to its input, $V_{ref}$, $V_{sns}$, and $V_{temp}$, and provides that voltage to a negative input of operational amplifier 465, where the voltage differentially combined with an output of multiplexer 468, amplified and provided to a positive input of differential amplifier 466 and 467. An inverted version of the same output signal is provided to a negative input of differential amplifier 466 and 467. Outputs of differential amplifiers 466 and 467 provide error voltages $V_{err1}$ and $V_{err2}$ to gates of power pass transistors. Differential amplifier 466 is controlled by DC1_enable from the logic control and timer circuit voltage that turns the amplifier on, if power source voltage DC1 is available. Similarly, differential amplifier 467 is controlled by DC2_enable voltage that turns the amplifier on, if power source voltage DC2 is available.

By turning differential amplifiers on if the respective power source voltage is available, current control loop and LDO amplifier 461 turns on the corresponding power pass transistor determining which power source is to be employed for charging the battery. DC1_enable and DC2_enable are provided by the logic control and timer circuit. If both power sources are available at the same time, logic control and timer circuit determines based on a predetermined algorithm, which power source is to be used. In one embodiment, power source 1 may be a preferred source and employed whenever both power sources are available.

The above specification, examples and data provide a description of the manufacture and use of the composition of the invention. Since many embodiments of the invention can be made without departing from the spirit and scope of the invention, the invention also resides in the claims hereinafter appended.

We claim:

1. A circuit for providing a charge voltage and current to a battery, comprising:

a logic control and timer circuit that is arranged to select at least one of at least two available power source voltages and provide a first and a second control voltages indicating the selection;

a current/voltage control circuit that is arranged to provide one of a first error voltage and a second error voltage in response to the first and second control voltages, such that:

if a first power source voltage is selected, the first error voltage controls, in part, regulation of the charge voltage and current; and if a second power source voltage is selected, the second error voltage controls, in part, regulation of the charge voltage and current;

a power pass and sense circuit that is arranged to provide the charge voltage and current in response to the selected power source voltage and the corresponding error voltage, a sense determination circuit that is arranged to receive a portion of the charge voltage, to receive a reference voltage, and to provide a sense voltage; and a multiplexer that is arranged to multiplex a voltage based on at least one limit current and the portion of the charge voltage, and to provide a feedback voltage, wherein the current/voltage control circuit is arranged to receive the sense voltage, the feedback voltage, a temperature voltage, a reference voltage, and a first enable voltage and a second enable voltage; and wherein the current/voltage control circuit is further arranged to provide the first error voltage and the second error voltage to the power pass and sense circuit, wherein current/voltage control circuit is further arranged to:

select a smaller of the reference voltage, the temperature voltage, and the sense voltage;

combine the selected voltage with the feedback voltage; and select at least one of the at least two available power source voltages based on the first and the second enable voltages.

2. The circuit of claim 1, wherein the current/voltage control circuit is arranged to receive at least one digital mode control signal, a plurality of sense voltages, a reference voltage, and the first and second control voltages; and is further arranged to provide the first and the second error voltages based on the received voltages.

3. The circuit of claim 1, further comprising:
a power supply circuit that is arranged to receive the at least one of at least two available power source voltages and to provide a global supply voltage to the circuit;
a voltage reference and thermo-sense circuit that is arranged to provide a plurality of reference voltages and a temperature dependent voltage to the current/voltage control circuit and to the logic control and timer circuit; and
a current setting circuit that is arranged to receive a sense current and a setting current, and to provide a sense voltage to the current/voltage control circuit such that a regulation of the charge voltage and current is based on a sensed current, the setting current, a temperature of the circuit, and a reference voltage; and
a reconfiguration circuit that is arranged to reconfigure an operation mode of the current/voltage control circuit to a low-voltage-dropout voltage regulation mode, if the battery is disconnected.

4. The circuit of claim 1, wherein the logic control and timer circuit is further arranged to receive a plurality of reference voltages, a setting current, and a portion of the charge voltage and current; and to determine at least one of a battery charge restart condition, a battery charge status, a battery temperature status, a battery charging current limit, or a power source availability.

5. The circuit of claim 1, wherein the logic control and timer circuit is further arranged to provide a timing signal to at least one other subcircuit.

6. The circuit of claim 1, wherein the logic control and timer circuit is further arranged to provide at least one status signal for external use.

7. The circuit of claim 3, further comprising:
a current source circuit, wherein the current source circuit includes at least one of an external current interface arranged to receive an external current from an external current source or an internal current source, and wherein the current source circuit is arranged to provide the setting current to the current setting circuit; and
a sense resistor, wherein the sense resistor is arranged such that a voltage across the sense resistor is related, in part, to the setting current.

8. The circuit of claim 7, wherein the current source circuit is arranged to receive an input signal and enable the internal current source based upon a state of the input signal.

9. The circuit of claim 4, further comprising:
a sense determination circuit that is arranged to receive a portion of the charge voltage, to receive a reference voltage, and to provide a sense voltage;
a multiplexer that is arranged to multiplex a voltage based on at least one limit current and the portion of the charge voltage, and to provide a feedback voltage, wherein the current/voltage control circuit is arranged to receive the sense voltage, the feedback voltage, a temperature voltage, a reference voltage, and a first enable voltage and a second enable voltage; and wherein the current/voltage control circuit is further arranged to provide the first error voltage and the second error voltage to the power pass and sense circuit.

10. The circuit of claim 9, wherein current/voltage control circuit is further arranged to:
select a smaller of the reference voltage, the temperature voltage, and the sense voltage;
combine the selected voltage with the feedback voltage; and
select at least one of the at least two available power source voltages based on the first and the second enable voltages.

11. The circuit of claim 1, wherein the current/voltage control circuit further includes:
a minority selection device that is arranged to determine a smaller of the reference voltage, the temperature voltage and the sense voltage;
an operational amplifier that is arranged to combine the feedback voltage and the smaller of the reference voltage, the temperature voltage, and the sense voltage; and to provide the combined voltage to two differential amplifiers; and
two differential amplifiers, wherein each differential amplifier is arranged to receive power from a body of the power pass and sense circuit, and to provide an error voltage to the power pass and sense circuit; and wherein the differential amplifiers are selectively enabled based on the first enable voltage and the second enable voltage.

12. A circuit for providing a charge voltage and current to a battery, comprising:
a logic control and timer circuit that is arranged to select at least one of two available power source voltages and provide a first and a second control voltages indicating the selection;
a current/voltage control circuit that is arranged to provide one of a first error voltage and a second error voltage in response to the first and second control voltages, such that:
if a first power source voltage is selected, the first error voltage is provided for regulation of the charge voltage and current; and
if a second power source voltage is selected, the second error voltage is provided for regulation of the charge voltage and current;
a power pass and sense circuit that is arranged to provide the charge voltage and current in response to the selected power source voltage and the corresponding error voltage;
a power supply circuit that is arranged to receive the at least one of two available power source voltages and to provide a global supply voltage to the circuit;
a voltage reference and thermo-sense circuit that is arranged to provide a plurality of reference voltages and a temperature dependent voltage to the current/voltage control circuit and to the logic control and timer circuit;
a current setting circuit that is arranged to receive a sense current and a setting current, and to provide a sense voltage to the current/voltage control circuit such that a regulation of the charge voltage and current is based on a sensed current, the setting current, a temperature of the circuit, and a reference voltage; and
a reconfiguration circuit that is arranged to reconfigure an operation mode of the current/voltage control circuit to a low-voltage-dropout voltage regulation mode, if the battery is disconnected, wherein the setting current is provided by at least one of an internal current source or another current source external to the current setting circuit, and wherein a first variable resistor is employed to determine a value of an internally supplied setting current and a second resistor is employed to determine a value of an externally supplied setting current.

13. The circuit of claim 12, wherein an external signal that is provided to a current selection input indicates if the internally supplied setting current is to be employed for determining a limit of a charging current.

14. The circuit of claim 12, wherein the power pass and sense circuit is further arranged to receive power from at least one of at least two available power source voltages and to provide a sense voltage, wherein the power pass and sense circuit includes:
- a power pass transistor that is arranged to receive the power source voltage and provide the charge voltage and current, wherein the power pass transistor has a body;
- a power sense transistor that is arranged to receive the power source voltage and provide the sense current, wherein the power sense transistor has a body;
- a pair of serially connected body switcher transistors, wherein the pair of serially connected body switcher transistors are coupled in parallel to the power pass transistor, and are arranged to connect the body of the power pass transistor and the body of the power sense transistor to one a power source voltage or the charge voltage, wherein each of the body switcher transistors has a gate;
- an inverter that is coupled between the respective gates of the body switcher transistors, and is arranged to control a conduction of the body switcher transistors; and
- a level shifter that is arranged to receive a digital power supply voltage and provide a control voltage to the gates of the body switcher transistors such that the transistors are turned on if a reverse bias current from at least one of the at least two power source voltages is present.

* * * * *